United States Patent
Gutarin et al.

(10) Patent No.: US 9,083,640 B2
(45) Date of Patent: *Jul. 14, 2015

(54) ADAPTIVE BIT RATE SWITCHING

(71) Applicant: Hulu, LLC, Santa Monica, CA (US)

(72) Inventors: Alexander V. Gutarin, Atherton, CA (US); Baptiste Coudurier, Los Angeles, CA (US)

(73) Assignee: HULU, LLC, Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/081,676

(22) Filed: Nov. 15, 2013

(65) Prior Publication Data

US 2014/0075045 A1 Mar. 13, 2014

Related U.S. Application Data

(63) Continuation of application No. 12/877,925, filed on Sep. 8, 2010, now Pat. No. 8,589,583.

(51) Int. Cl.
- *G06F 15/16* (2006.01)
- *H04L 12/835* (2013.01)
- *H04L 12/853* (2013.01)
- *H04L 12/811* (2013.01)

(52) U.S. Cl.
CPC ............ *H04L 47/30* (2013.01); *H04L 47/2416* (2013.01); *H04L 47/38* (2013.01)

(58) Field of Classification Search
None
See application file for complete search history.

(56) References Cited

U.S. PATENT DOCUMENTS

| | | |
|---|---|---|
| 5,757,802 A | 5/1998 | Yoo |
| 6,385,673 B1 | 5/2002 | DeMoney |
| 6,529,552 B1 | 3/2003 | Tsai et al. |
| 7,925,770 B1 | 4/2011 | Hamel et al. |
| 8,005,138 B2 | 8/2011 | Wu et al. |
| 8,230,105 B2 | 7/2012 | Melnyk et al. |
| 8,589,583 B2 | 11/2013 | Coudurier et al. |
| 2003/0072370 A1 | 4/2003 | Girod et al. |
| 2003/0109261 A1 | 6/2003 | Razavilar et al. |
| 2006/0168082 A1 | 7/2006 | Yang et al. |
| 2007/0263072 A1 | 11/2007 | Lochbaum et al. |
| 2010/0077039 A1 | 3/2010 | Collet et al. |
| 2010/0146145 A1 | 6/2010 | Tippin et al. |

OTHER PUBLICATIONS

International Search Report, PCT Application No. PCT/US2011/050554, mailed Jan. 20, 2011.

*Primary Examiner* — Thomas Dailey

(74) *Attorney, Agent, or Firm* — Fountainhead Law Group PC

(57) ABSTRACT

In one embodiment, a method determines data describing a temporal variability of a bit rate of a first bitstream and receives the first bitstream through a communication channel. A throughput for the communication channel is determined. The method then compares the throughput of the communication channel with the data describing the temporal variability of the bit rate of the first bitstream to determine a variance of the first bitstream from the throughput for the communication channel for a portion of the media program not already received. An amount of data currently buffered in a buffer for the media program is determined and then the method compares the amount of data currently buffered to the variance for the portion to determine whether to switch to receiving a second bitstream. The second bitstream has a different bit rate from the first bitstream.

26 Claims, 13 Drawing Sheets

```
#EXTM3U
#EXT-X-VERSION:2
#EXT-X-STREAM-INF:PROGRAM-ID=1,BANDWIDTH=1500000
https://play.hulu.com/play/50000011/1500.m3u8?b=IUEfAAK7tmEfAAK7cWEfAAK7cXEfAAK7tmEfAAK75g&auth=12756
9313_5741adc3bf3b05dde40a764ccbf4a580
#EXT-X-STREAM-INF:PROGRAM-ID=1,BANDWIDTH=3200000
https://play.hulu.com/play/50000011/3200.m3u8?b=IUE_AAK7uGE_AAK7fHE_AAK7fHE_AAK7fGE_AAK76Q&auth=12756
93133_35fe265cbda4a38d8476ddd28641425
#EXT-X-STREAM-INF:PROGRAM-ID=1,BANDWIDTH=2500000
https://play.hulu.com/play/50000011/2500.m3u8?b=IUE_AAK7uGE_AAK7fGE_AAK7fHE_AAK7fHE_AAK76Q&auth=12756
93133_afc6f221eec4ff3fe0c9a3759b293716
#EXT-X-STREAM-INF:PROGRAM-ID=1,BANDWIDTH=1000000
https://play.hulu.com/play/50000011/1000.m3u8?b=IUEfAAK7tmEfAAK7cWEfAAK7cXEfAAK7tmEfAAK75g&auth=12756
93133_1fb1bdb09679b5d15b4a6d42a07732a6
#EXT-X-STREAM-INF:PROGRAM-ID=1,BANDWIDTH=400000
https://play.hulu.com/play/50000011/400.m3u8?b=IUENAAK7tGENAAK7d2ENAAK7d3ENAAK7tGENAAK77A&auth=127569
3133_c594ccb82222ce3d2b78f973519ab046
#EXT-X-STREAM-INF:PROGRAM-ID=1,BANDWIDTH=200000
https://play.hulu.com/play/50000011/200.m3u8?b=IUEGAAK7wGEGAAK7e2EGAAK7e3EGAAK7wGEGAAK78A&auth=127569
3133_d15798fec9d1a823b0d5d2ecaabb9559
#EXT-X-STREAM-INF:PROGRAM-ID=1,BANDWIDTH=128000
https://play.hulu.com/play/50000011/128.m3u8?b=IUECAAK7vmECAAK7eWECAAK7eXECAAK7vmECAAK77g&auth=127569
3133_f7684af26d68e76be692142a488b9b5a
#EXT-X-STREAM-INF:PROGRAM-ID=1,BANDWIDTH=64000
https://play.hulu.com/play/50000011/64.m3u8?b=IUEGAAK7wGEGAAK7e3EGAAK7e2EGAAK7wGEGAAK78A&auth=1275693
133_eafef75f4e967d0d0fed5fbf815f9596
```

```
#EXTM3U
#EXT-X-VERSION:2
#EXT-X-TARGETDURATION:14
#EXT-X-MEDIA-SEQUENCE:0
#EXT-X-ALLOW-CACHE:NO
#EXTINF:10,
https://hulus-a.akamaihd.net/hulu12/11/50000011/agave50000011_586724_samourai.tar/segmen
t0.ts?authToken=1275693133_621cbee69581fe8099c28b148d9a744c
#EXTINF:10,
https://hulus-a.akamaihd.net/hulu12/11/50000011/agave50000011_586724_samourai.tar/segmen
t1.ts?authToken=1275693133_44d2f237b0f46f7791afe1661ef7ea20
#EXTINF:11,
https://hulus-a.akamaihd.net/hulu12/11/50000011/agave50000011_586724_samourai.tar/segmen
t2.ts?authToken=1275693133_b163e96bb90f8644dfa2e9e52c282e74
#EXTINF:11,
https://hulus-a.akamaihd.net/hulu12/11/50000011/agave50000011_586724_samourai.tar/segmen
t3.ts?authToken=1275693133_66ba79cf7a3cb3df5eed36e29beb4cbf
. . .
#EXTINF:3,
https://hulus-a.akamaihd.net/hulu12/11/50000011/agave50000011_586724_samourai.tar/segmen
t117.ts?authToken=1275693133_2c6c361e75ed8d08655752b3a505ca24
#EXT-X-ENDLIST
```

ADAPTIVE BIT RATE SWITCHING

CROSS-REFERENCE TO RELATED APPLICATIONS

This application is a continuation of U.S. patent application Ser. No. 12/877,925 filed Sep. 8, 2010 entitled "METHOD AND APPARATUS FOR ADAPTIVE BIT RATE SWITCHING," issued on Nov. 19, 2013 as U.S. Pat. No. 8,589,583, which is incorporated by reference in its entirety for all purposes.

BACKGROUND OF THE INVENTION

1. Field of the Invention

The present invention relates to systems and methods for providing streamed media programs and in particular, to a method and apparatus for adapting a media program player to select a media program bitstream having the appropriate bit rate for communication channel conditions.

2. Description of the Related Art

The dissemination and playback of media programs has undergone substantial changes in the past decade. Previously, media programs (which may include audio, video, or both) were disseminated either by analog broadcast (conventional, satellite, or cable) or by dissemination of films to movie theaters.

These traditional dissemination and playback means remain in use after the advent of digital technology. However, digital technologies have had a profound effect on the dissemination and playback of media programs.

First, digital technology permitted the use of digital video recorders (DVRs). DVRs, while similar in function to standard analog video cassette recorders (VCRs), provide a number of additional useful functions including live pause, the ability to record one program while playing back another, and the integration of the electronic program guides with DVR functionality (so that the recordation of media programs could be scheduled far in advance).

Second, digital technology also permitted the dissemination and playback of media programs via the Internet, and with improved signal processing and more and more households with high-speed Internet access (e.g. DSL, fiber, and/or satellite). These methods of dissemination and playback have become competitive with traditional means. Dissemination of media programs via the Internet may occur either by simple downloading, progressive downloading or streaming.

Progressive Downloading

For progressive download, a media file having the media program is downloaded via the Internet using dial-up, DSL, ADSL, cable, T1, or other high speed connection. Such downloading is typically performed from a web server via the Internet.

Simple downloading downloads the bytes of the media file in any convenient order, while progressive download downloads bytes at the beginning of a file and continues downloading the file sequentially and consecutively until the last byte. At any particular time during progressive downloading, portions of the file may not be immediately available for playback. In some situations, the entire file must be downloaded first before a media player can start playback. In other progressive download situations, media players are able to start playback once enough of the beginning of the file has been downloaded, however, the media player must download enough information to support some form of playback before playback can occur. Playback of progressively downloaded media files is often delayed by slow Internet connections and is also often choppy and/or contains a high likelihood of stopping after only a few seconds. Once a progressively downloaded media program has been completely downloaded, it may be stored on the end-user computer for later use.

One of the disadvantages of a progressive downloading is that the client simply pulls the data to the client as fast as possible. It may appear to be "streaming" the video because the progressive download capability of many media players allows playback as soon as an adequate amount of data has been downloaded. However, the user cannot typically fast-forward to the end of the file until the entire file has been delivered by the web server. Another disadvantage with progressive downloading is that the web server does not make allowances for the data rate of the video file. Hence if the network bandwidth is lower than the data rate required by the video file, the user will have to wait a period of time before playback can begin. If playback speed exceeds the data transfer speed, playback may be paused for a period of time while additional data is downloaded, interrupting the viewing experience. However, the video playback quality may be higher when the playback occurs because of the potentially higher data rate. For example, if a 100 kbps video file can be delivered over a 56 kbps modem, the video will be presented at the 100 kbps rate, but there may be periods when playback will be paused while additional video data is downloaded. The video data is typically downloaded and stored as a temporary file in its entirety.

Web servers typically use HTTP (hypertext transport protocol) on top of TCP (transfer control protocol) to transfer files over the network. TCP, which controls the transport of data packets over the network, is optimized for guaranteed delivery of data, not speed. Therefore, if a browser senses that data is missing, a resend request will be issued and the data will be resent. In networks with high delivery errors, resend requests may consume a large amount of bandwidth. Since TCP is not designed for efficient delivery of adequate data or bandwidth control (but rather guaranteed delivery of all data), it is not preferred for the delivery of video data in all applications.

Streaming

Streaming delivers media content continuously to a media player and media playback occurs simultaneously. The end-user is capable of playing the media immediately upon delivery by the content provider. Traditional streaming techniques originate from a single provider delivering a stream of data to a set of end-users. High bandwidths and central processing unit (CPU) power are required to deliver a single stream to a large audience, and the required bandwidth of the provider increases as the number of end-users increases.

Unlike progressive downloading, streaming media can be delivered on-demand or live. Wherein progressive download requires downloading the entire file or downloading enough of the entire file to start playback at the beginning, streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities.

A streaming media server is a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player. Unlike the web server, the streaming media server communicates with the user computer using control messages and data messages to adjust to changing network conditions as the video is played. These control messages can include commands for trick play functions such as fast forward, fast reverse, pausing, or seeking to a particular part of the file. Since a streaming media server transmits video data only as needed and at the rate that is needed, precise control over the number of streams served can be maintained. Unlike the case with progressive downloading, the viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) do not permanently store the video file in the viewer's computer (the file is ultimately discarded by the media player, thus allowing more control over the content).

Streaming media servers may use HTTP, TCP or RTSP (real time streaming protocol) to deliver video streams, but generally use RTMP (real time messaging protocol) and UDP (user datagram protocol). These protocols permit control messages and save bandwidth by reducing overhead. Unlike TCP, when data is dropped during transmission, UDP does not transmit resent requests. Instead, the server continues to send data. Streaming media servers can also deliver live webcasts and can multicast, which allows more than one client to tune into a single stream, thus saving bandwidth.

Typically, progressively downloaded media is transmitted to the user computer at a rate that is faster than playback. The media program player 304 buffers this data, and may indicate how much of the media program has been buffered by providing an indicator, usually as a part of a "progress bar." A control is often provided that allows the user to go to any point in the program that has already been buffered by selecting the control and moving it to a different location along the progress bar. This allows the user to randomly access any buffered portion of the media program.

Streaming media players do not rely on buffering to provide random access to any point in the media program. Instead, this is accomplished through the use of control messages transmitted from the media player to the streaming media server.

Mobile Devices

There is a desire to transmit media programs to mobile media program playback devices such as cellphones, IPHONES, PDAs, laptop computers, and the like. Transmission of media programs to mobile devices offers additional challenges, as the bandwidth of the communication channel is typically reduced, and the processing power of the device itself is typically less than that of an ordinary computer or special purpose device.

Transmission protocols have been developed to transmit media programs to such devices, including live media programs. The transmission of live media programs can be even more challenging as the length of such streams is unbounded. One such transmission protocol is the HTTP live streaming protocol of the IETF (Internet Engineering Task Force) Trust available at http://tools.ietf.org/html/draft-pantos-http-live-streaming-04 and provided in the Appendix attached hereto.

Throughput

Whether via HTTP, TCP, RTSP, RTMP, UDP, or live streaming, the throughput of the communications channel used to transceive media programs is highly variable and difficult to predict. Accordingly, media servers typically store several different versions of each media program, with each different version optimized for different communications channel throughput, and the appropriate version is selected for transception based upon the communications channel throughput.

However, while the bit rate of most streamed media programs is temporally constant, this is not the case where variable bit rate encoding is employed. With variable bit rate encoding, the media program is encoded using a bit rate that varies with the program material, and hence, varies with time as well. These temporal variations of the bit rate give rise to situations wherein the bandwidth of the communications channel is sufficient or more than is required for portions of the media program, but insufficient for other portions. Since decisions are made with respect to current throughput and the average bit rate of the media program stream, such variations cause two problems: (1) the buffer becoming empty during the bitrate peak, resulting in choppy playback, and (2) the media program player may not switching up to a higher bitrate during a valley, which results in lower quality video displayed to the user who is capable of viewing a higher quality stream.

What is needed is a method and apparatus allowing selection of media program bit-streams according to time-varying bit rate requirements. The present invention satisfies this need.

SUMMARY OF THE INVENTION

In one embodiment, a method determines data describing a temporal variability of a bit rate of a first bitstream and receives the first bitstream through a communication channel. A throughput for the communication channel is determined. The method then compares the throughput of the communication channel with the data describing the temporal variability of the bit rate of the first bitstream to determine a variance of the first bitstream from the throughput for the communication channel for a portion of the media program not already received. An amount of data currently buffered in a buffer for the media program is determined and then the method compares the amount of data currently buffered to the variance for the portion to determine whether to switch to receiving a second bitstream. The second bitstream has a different bit rate from the first bitstream.

In another embodiment, a non-transitory computer-readable storage medium contains instructions, that when executed, control a computer system to be configured for: determining data describing a temporal variability of a bit rate of a first bitstream; receiving the first bitstream through a communication channel; determining a throughput for the communication channel; comparing the throughput of the communication channel with the data describing the temporal variability of the bit rate of the first bitstream to determine a variance of the first bitstream from the throughput for the communication channel for a portion of the media program not already received; determining an amount of data currently buffered in a buffer for the media program; and comparing the amount of data currently buffered to the variance for the portion to determine whether to switch to receiving a second bitstream, wherein the second bitstream has a different bit rate from the first bitstream.

In another embodiment, a method includes: generating, by a computing device, data describing the temporal variability of the bit rate of a first bitstream; receiving, by the computing device, a request for a media program from a user device; transmitting, by the computing device, the data describing the temporal variability of the bit rate of the first bitstream; transmitting, by the computing device, the first bitstream on a communication channel; receiving, by the computing device, a request for the second bitstream from the user device, the request based at least in part on a first comparison of a throughput of the communication channel with the data describing the temporal variability of the bit rate of the first bitstream to determine a variance of the first bitstream from the throughput for the communication channel for a portion of the media program not already received and a second comparison of the amount of data currently buffered to the variance for the portion to determine whether to switch to receiving a second bitstream; and transmitting, by the computing device, the second bitstream on the communications channel, wherein the second bitstream has a different bit rate from the first bitstream.

In another embodiment, an apparatus includes: one or more computer processors; and a non-transitory computer-readable storage medium comprising instructions, that when executed, control the one or more computer processors to be configured for: generating data describing the temporal variability of the bit rate of a first bitstream; receiving a request for a media program from a user device; transmitting the data describing the temporal variability of the bit rate of the first bitstream; transmitting the first bitstream on a communication channel; receiving a request for the second bitstream from the user device, the request based at least in part on a first comparison of a throughput of the communication channel with the data describing the temporal variability of the bit rate of the first bitstream to determine a variance of the first bitstream from the throughput for the communication channel for a portion of the media program not already received and a second comparison of the amount of data currently buffered to the variance for the portion to determine whether to switch to receiving a second bitstream; and transmitting the second bitstream on the communications channel, wherein the second bitstream has a different bit rate from the first bitstream.

BRIEF DESCRIPTION OF THE DRAWINGS

Referring now to the drawings in which like reference numbers represent corresponding parts throughout:

FIG. 5 is a diagram illustrating an exemplary embodiment of the master playlist;

FIG. 6 is a diagram of an exemplary segment playlist;

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
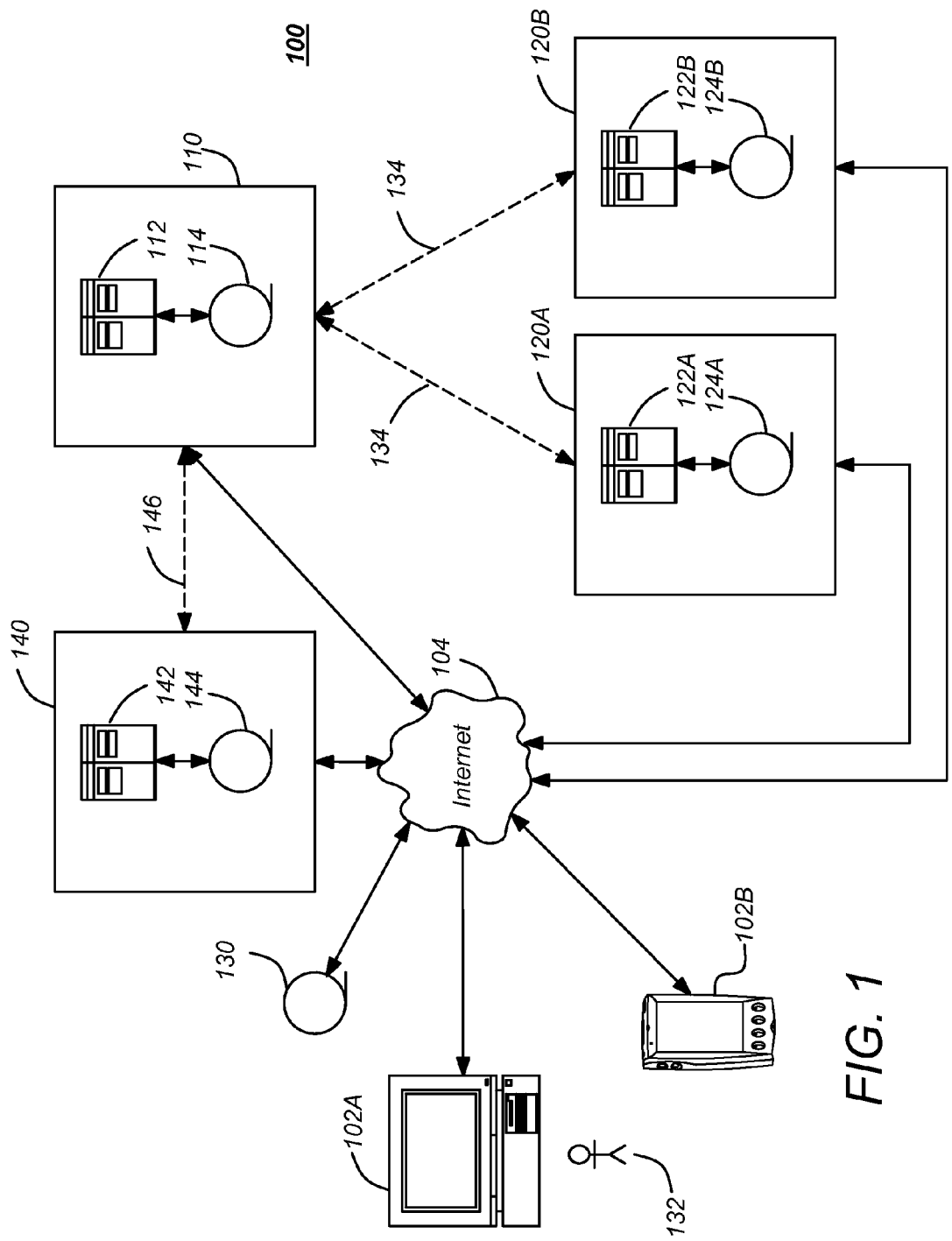
FIG. 1 is a diagram illustrating an exemplary media program system.

FIG. 1 is a diagram illustrating an exemplary media program system 100. In the illustrated embodiment, the system 100 may comprise one or more media program sources 120A, 120B, communicatively coupled to a communication network 104 such as the Internet and each having one or more source video servers 122A, 122B communicatively coupled to one or more source media program databases 124A, 124B. The media program system 100 further comprises a media program provider 110, communicatively coupled to the communication network 104, and having one or more provider video servers 112 and one or more provider databases 114. In one embodiment, the media program provider 110 is a video-on-demand and/or streaming media program provider.

The media program system 100 transmits media programs to a first user device 102A such as a computer or a second user device 102B such as a cellphone (hereinafter alternatively referred to as user device(s) 120). This transmission may be direct from the media program provider 110, or the media program provider 110 may operate as a portal, providing an interface to the media programs available from the media program sources 120A and 120B, but not the media program itself (which is instead provided by the media program source (s) 120).

In the first case, the media program provider 110 licenses media programs from the media program sources 120 (such as www.fox.com or www.nbc.com), and metadata for such programs is also typically provided to the media program provider 110 from the media program source 120 as well. Such metadata can be retrieved by the media program provider's database 114 for use. If supplementary metadata is required, it can be obtained from a metadata source 130 independent from the media program provider 110 and the media program source 120, as described further below.

In the second case, the media programs are streamed to the user device 102 directly from the servers of the media program source 120. When the media program is streamed directly from the media program source 120, it is often the case that the metadata provided by the media program source 120 is insufficient. In such cases, supplementary metadata may be obtained from independent metadata source 130 (such as www.tv.com or www.imdb.com) or other third party sources. In this circumstance, the role of the media program provider 110 is that of a portal that provides the user 132 with a list of available media programs and an interface to search to find such programs and to view them.

Media programs and metadata may be obtained via a communication network 104 such as the Internet, or through auxiliary (and/or dedicated) communication links 134). Such information may be obtained by webcrawling (for example, using a program or automated script that browses the World Wide Web in a methodical, automated manner).

Using the user devices 102, remote users 132 can communicate with the media program provider 110 using the communication network 104, to obtain media programs (including video-on-demand and/or streaming video services) and to search the provider media program database 114 to find media programs of interest.

The media program system 100 may also comprise one or more advertisement providers 140, which supply advertisements that are replayed in connection with the media programs provided by the media program provider 110 or media program sources 120. In the illustrated embodiment, the advertisement provider 140 includes an advertisement provider server 142 communicatively coupled to an associated and communicatively coupled advertisement provider database 144.

Advertisements may be supplied from the advertisement provider 140 to the media program provider 110 via the Internet 104, a dedicated link 146, or by physical exchange of a memory storage device having the advertisement. Such advertisements can be provided to and stored by the media program provider 110 and streamed or downloaded along with the media program to the user device(s) 102 at the appropriate time.

In one embodiment, the advertisements are integrated with the streamed or downloaded video from the media program provider 110. In another embodiment, the advertisements are not integrated with the media program, but are instead transmitted to the user devices 102 separately from the media program, and replayed at the appropriate time using indices that indicate when each advertisement should be presented. For example, advertisements can be indexed and streamed or downloaded to the user devices 102 (from the media program provider 110 or the advertisement provider 140), and such advertisements can be played back to the user 132 at times indicated by corresponding indices in the media program.

Figure 2:
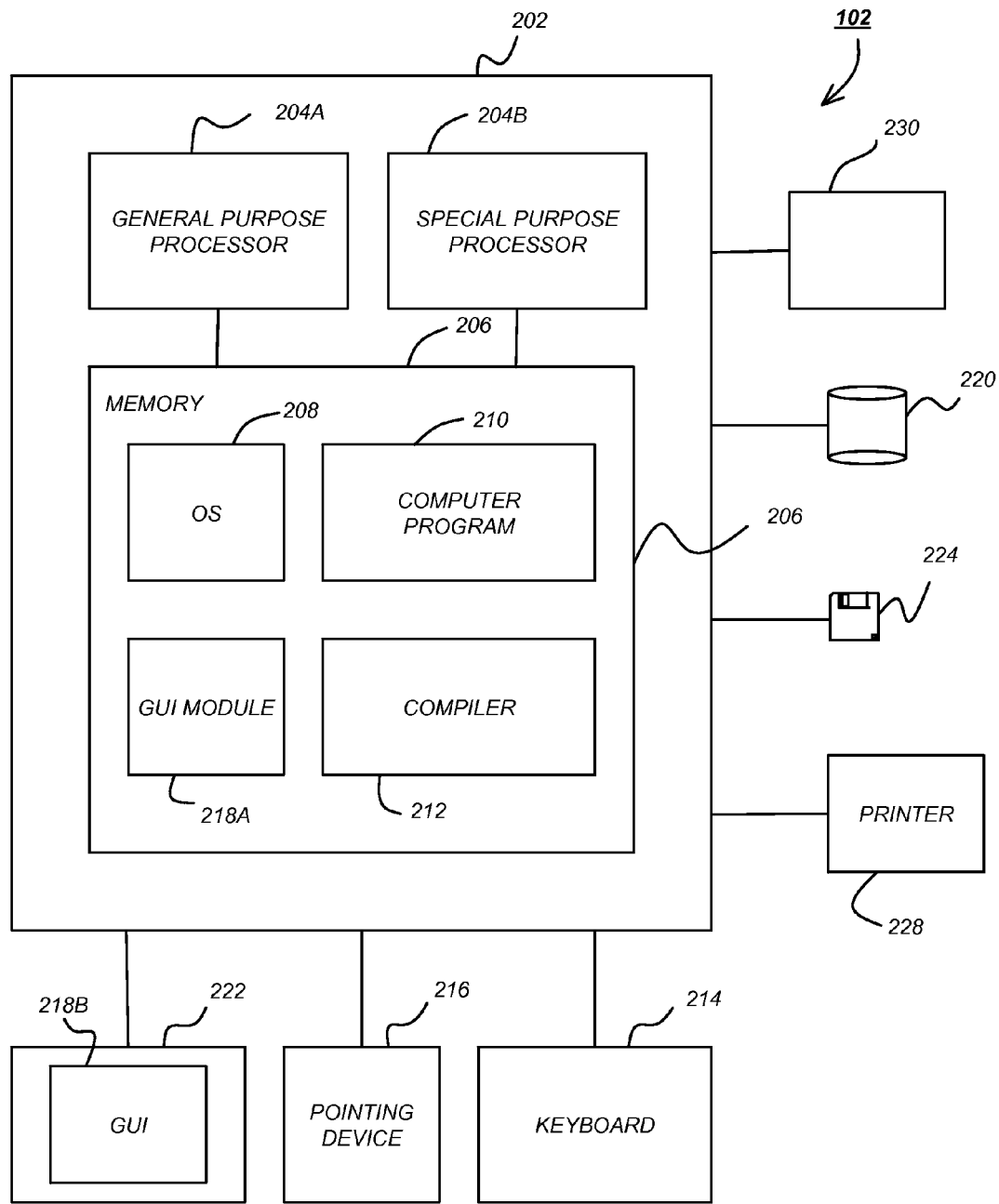
FIG. 2 illustrates an exemplary computer system that could be used to implement the present invention.

FIG. 2 illustrates an exemplary computer system 202 that could be used to implement elements of the present invention, including the user devices 102, servers 112, 122, and 142 and the databases 114, 124, and 144. The computer 202 comprises a general purpose hardware processor 204A and/or a special purpose hardware processor 204B (hereinafter alternatively collectively referred to as processor 204) and a memory 206, such as random access memory (RAM). The computer 202 may be coupled to other devices, including input/output (I/O) devices such as a keyboard 214, a mouse device 216 and a printer 228.

In one embodiment, the computer 202 operates by the general purpose processor 204A performing instructions defined by the computer program 210 under control of an operating system 208. The computer program 210 and/or the operating system 208 may be stored in the memory 206 and may interface with the user 132 and/or other devices to accept input and commands and, based on such input and commands and the instructions defined by the computer program 210 and operating system 208 to provide output and results.

Output/results may be presented on display 222 or provided to another device for presentation or further processing or action. Typically, the display 222 comprises a plurality of picture elements (pixels) that change state to collectively present an image to the user 132. For example, the display 222 may comprise a liquid crystal display (LCD) having a plurality of separately addressable pixels, each with a liquid crystal that changes to an opaque or translucent state to form a part of the image on the display in response to the data or information generated by the processor 204 from the application of the instructions of the computer program 210 and/or operating system 208 to the input and commands. Similarly, plasma displays include a pixel having three separate subpixel cells, each with a different color phosphor. The colors blend together to create the color presented in the pixel. Pulses of current flowing through the cells are varied according to the data generated by the processor from the application of the instructions of the computer program and/or operating system 208 in response to input and commands, changing the intensity of the light provided by the pixel. Also, similarly, cathode ray tube (CRT) displays include a plurality of pixels, each with each pixel having subpixels typically represented by dots or lines from an aperture grille. Each dot or line includes a phosphor coating that glows when struck by electrons from an electron gun. In response to the data generated by the processor from the application of instructions of the computer program and/or operating system 208 and in response to input and commands, the electrons emitted by the electron gun are steered at the dots or lines, thus changing the state of the associated pixel by causing the phosphor coating of that dot or line to glow.

The image may be provided through a graphical user interface (GUI) module 218A. Although the GUI module 218A is depicted as a separate module, the instructions performing the GUI functions can be resident or distributed in the operating system 208, the computer program 210, or implemented with special purpose memory and processors.

Some or all of the operations performed by the computer 202 according to the computer program 110 instructions or may be implemented in a special purpose processor 204B. Further, some or all of the computer program 210 instructions may be implemented via firmware instructions stored in a read only memory (ROM), a programmable read only memory (PROM) or flash memory within the special purpose processor 204B or in memory 206. The special purpose processor 204B may also be hardwired through circuit design to perform some or all of the operations to implement the present invention. Further, the special purpose processor 204B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 202 may also implement a compiler 212 which allows an application program 210 written in a programming language such as COBOL, C++, FORTRAN, or other language to be translated into processor 204 readable code. After completion, the application or computer program 210 accesses and manipulates data accepted from I/O devices and stored in the memory 206 of the computer 202 using the relationships and logic that were generated using the compiler 212.

The computer 202 also optionally comprises an external communication device such as a modem, satellite link, Ethernet card, or other device for accepting input from and providing output to other computers.

In one embodiment, instructions implementing the operating system 208, the computer program 210, and the compiler 212 are tangibly embodied in a computer-readable medium, e.g., data storage device 220, which could include one or more fixed or removable data storage devices, such as a zip drive, floppy disc drive 224, hard drive, CD-ROM drive, tape drive, DVD, etc. Further, the operating system 208 and the computer program 210 are comprised of computer program instructions which, when accessed, read and executed by the computer 202, causes the computer 202 to perform the steps necessary to implement and/or use the present invention or to load the program of instructions into a memory, thus creating a special purpose data structure causing the computer to operate as a specially programmed computer executing the method steps described herein. Computer program 210 and/or operating instructions may also be tangibly embodied in memory 206 and/or data communications devices 230, thereby making a computer program product or article of manufacture according to the invention. As such, the terms "article of manufacture," "program storage device" and "computer program product" as used herein are intended to encompass a computer program accessible from any computer readable device or media.

Of course, those skilled in the art will recognize that any combination of the above components, or any number of different components, peripherals, and other devices, may be used with the computer 202.

Although the term "user computer" is referred to herein, it is understood that a user computer 102 may include portable devices such as cellphones, portable MP3 players, video game consoles, notebook computers, pocket computers, personal data assistants (PDAs) or any other device with suitable processing, communication, and input/output capability.

Figure 3:
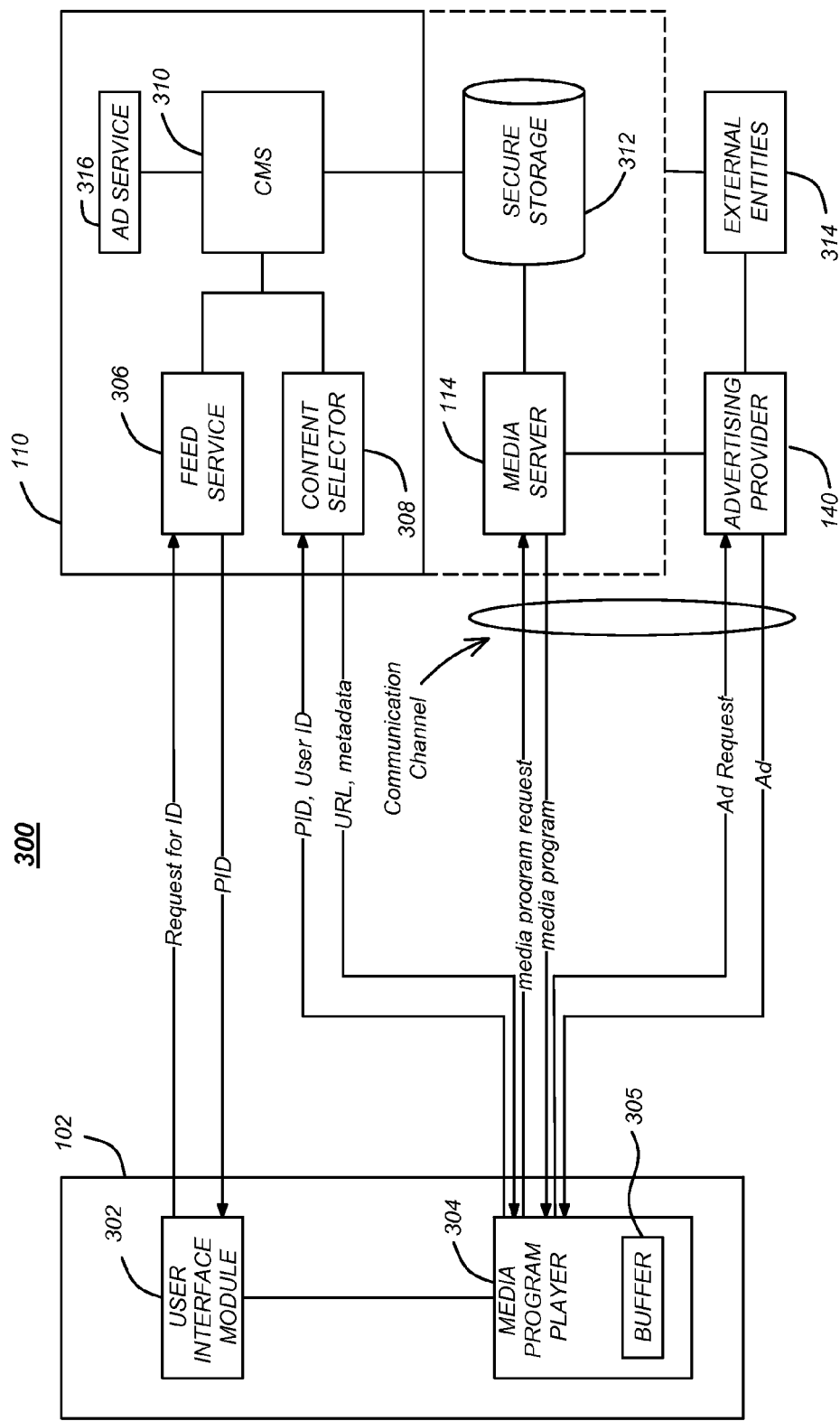
FIG. 3 is a diagram illustrating a content delivery subsystem and top-level operations that can be used to deliver media programs and advertisements for presentation to a user.

FIG. 3 is a diagram illustrating a first embodiment of a content delivery subsystem (CDS) 300 and top-level operations that can be used to deliver media programs and advertisements for presentation to the user 132 according to the HTTP, TCP, RSTP, or similar protocols. Using these protocols, the throughput of the data transmitted to the media program player 110 can be changed during media program delivery according to a request from the media program player 110 or on the initiative of the media server 114. For example, RTSP defines a speed request header field that requests that the media server deliver the data to the media program player at a particular speed, consistent with the media server's ability and desire to provide the media at that speed.

In the illustrated embodiment, the content delivery subsystem 300 includes the user device 102, a media program provider 110, and an advertisement provider 140. The media program provider 110 comprises a feed service 306, a content selector 308 and a content management service 310. When the user 132 selects a media program using the user device 102, a message is transmitted from the user device 102 to the media program provider 110 requesting the media program identifier (PID) of the selected media program. The feed service 306 receives the request, and using information obtained from secure storage 312 via the content management service 310, the feed service 306 determines the PID for the selected media program and transmits the PID to the user device 102. The user device transmits this PID and a user ID to the content selector 308 of the media program provider 110. The content selector 308 forwards the information to the content management service 310, which uses the advertisement service 318 to select advertisements appropriate for the user and selected media program, using information stored in secure storage 312. This may be accomplished as described in co-pending patent application Ser. No. 12/787,679, entitled "METHOD AND APPARATUS FOR RAPID AND SCALABLE DIRECTED ADVERTISING SERVICE," by Wing Chit Mak, filed May 26, 2010, which application is hereby incorporated by reference herein. The content management service 310 forwards this information to the content selector 318, which transmits information from which the user device 102 may obtain the selected media program from the media server 114, as well as advertisements from the advertising provider 140. In the illustrated embodiment, this information includes the address (e.g. URL) where the desired media program can be obtained from the media server 114. The user device 102 transmits a media program request to the media server 114 at a specified address. The media server 114 retrieves the media program from secure storage, and transmits the media program to the user device 102. The user device 102 receives the transmitted media program, and may temporarily store the media program in buffer 305. Buffer 305 may include hardware and/or software buffering, and may be resident in the media program player 305, or elsewhere in the user device 102.

The user device 102 may also request advertisements from the advertising provider 120 and receive them as well. Typically, media server 114 has a plurality of versions of the media program, each suitable for communication channels of different throughput or bandwidth. Using information received from the user device 102 or elsewhere, the media player 114 determines the most appropriate version of the media program to transmit to the user device 102. This determination can be based, for example, upon the bandwidth or available bit rate of the communication channel used to transmit the media program to the user device 102, the throughput of the user device and the size and speed of the buffer 305 implemented in the user device 102.

The user device 102 then receives the media program. Typically, the media program data is stored in a hardware or software buffer 305 in the user device, and retrieved in a first-in-first-out (FIFO) manner. Since the average bit rate of the delivered media program version is less than the bandwidth capability of the communications channel, the buffer 305 fills while the media program is being played. Buffered data is available even when the communication channel bandwidth or the bit rate of the media program changes, and hence, the buffered data can be used to reduce choppy playback.

If the user device 102 determines that the media program is not being delivered at the required bit rate (the rate at which the data is consumed to play the media program exceeds the rate that the data is received to an extent wherein the buffer 305 cannot adequately prevent choppy playback), the user device 102 may send a message to the media server 114 requesting a different version of the media program (e.g. one suitable for transmission at a lower bit rate). Conversely, if the user device 102 determines that the media program is being delivered at greater than the required bit rate, the user device 102 may send a message to the media server requesting a version of the media program suitable for transmission at a higher bit rate. This may provide the user 132 with a higher resolution version of the media program.

Although the advertisement provider 140 and media server 114 is illustrated as a separate architectural entity than the media program provider 110, the advertisement provider 140 may be integrated with the media program provider 110 (that is, the media program provider may also provide the advertisements). The CDS 300 provides a means to provide media programs and advertisements across a plurality of distribution networks, which may include www.hulu.com, www.imdb.com, www.aol.com or www.msn.com.

Metadata related to media program and advertisement content as well as streaming information may be stored in the content delivery system 300 in database 312, as is data describing where the media programs and advertisements may be found within the CDS 300.

The user device 102 may include an interface module 302 and a media program player 304. The interface module 302 includes instructions performed by the user device 102 that are used to present information and media programs to the user 132 and to accept user input, including commands. Exemplary user devices 102 are a desktop computer, a laptop computer, or a portable device such as an IPOD, IPHONE, IPAD, a portable telephone, or a PALM device.

In another embodiment, the foregoing is implemented without requiring the user device 102 to receive the PID and transmit it to the content selector, and instead, merely accepts a request for the media program from the user device and produces a URL and metadata that is transmitted to the user device 102 and used to obtain the media program from the media server 114.

Figure 4:
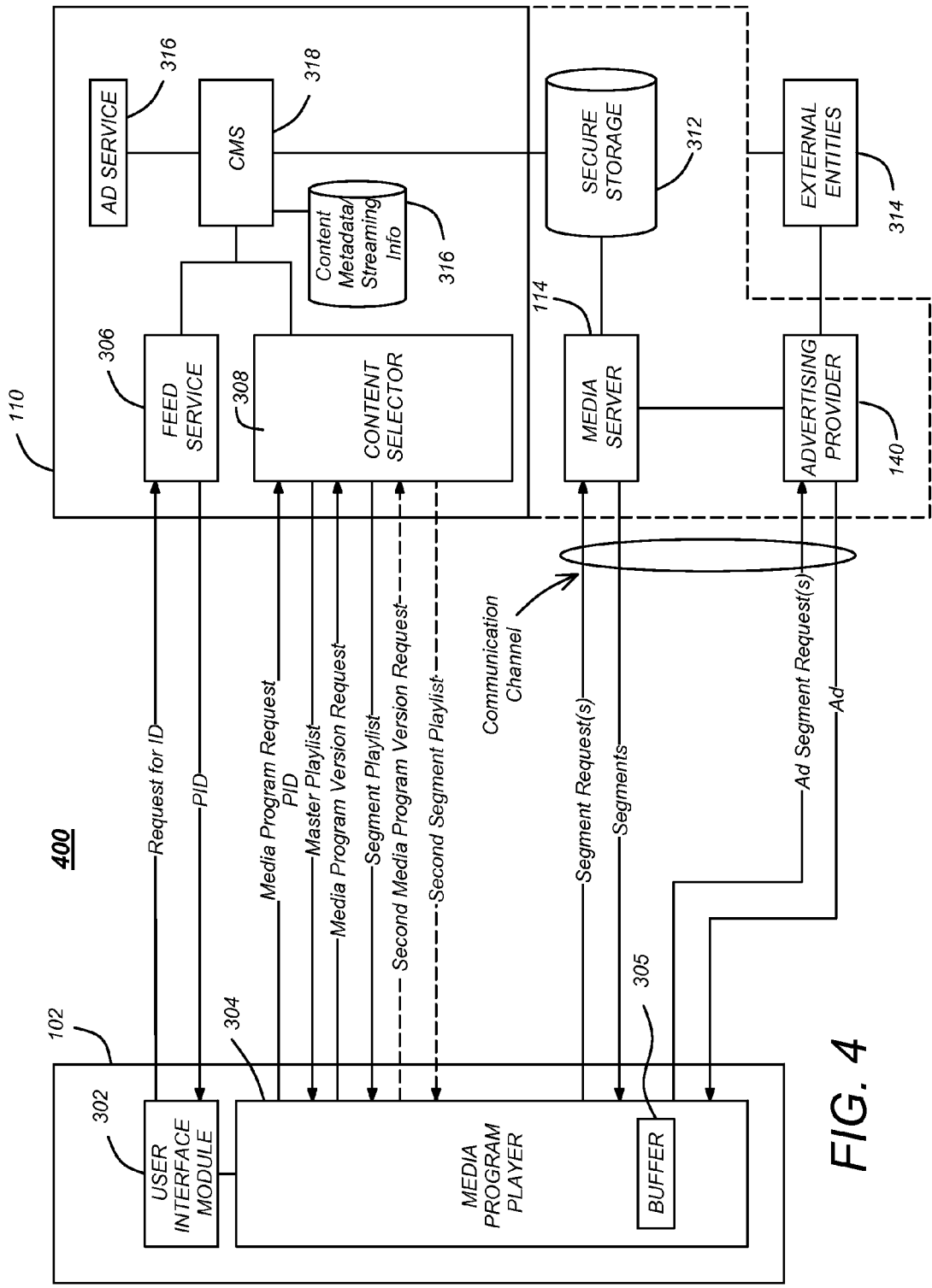
FIG. 4 is a diagram illustrating a content delivery system 400 that provides for the transmission of media programs according to a live streaming protocol.

FIG. 4 is a diagram illustrating a content delivery system 400 that provides for the transmission of media programs according to a live streaming protocol. This protocol is especially useful for mobile and wireless devices. Fundamentally, this protocol is similar to the protocol illustrated in FIG. 3, except that the when the user device 102 requests the media program, it is provided with a "playlist" of small segments or "chunks" of the media program. The user device 102 uses the playlist to request transmission of each chunk of the media program in order, and when each chunk is received, it is processed and assembled into the media program presented to the user 132.

As shown in FIG. 4, the user device 102 transmits a request for the PID of the media program to the feed service 306. The request typically comprises a user ID or a proxy thereof, as well as some identification for the media program. The feed service 306 receives the request, and obtains the PID of the requested media program from the CMS 310, using information obtained from secure storage 312 and content metadata/streaming information database. The PID is then transmitted to the user device 102. The user device then transmits a media program request with the PID to the content selector 308.

A media program request having the PID is then transmitted to a content selector 308, which forwards the information to the content management service 310. The content management system 318 uses the advertisement service 318 to select advertisements appropriate for the user and selected media program, using information stored in secure storage 312. Again, this may be accomplished as described in co-pending patent application Ser. No. 12/787,679 as described above. The content management service 310 forwards this information to the content selector 318. The content selector 308 may then generate a master playlist.

FIG. 5 is a diagram illustrating an exemplary embodiment of the master playlist 500. The master playlist includes a plurality of links 502A-502H, each associated with a segment playlist for the media program expressed in different bit rates. For example, link 502A is associated with a segment playlist for a 1.5 Mbps bit rate version of the media program. Link 502B is associated with a segment playlist for a 3.2 MBPS version of the media program, while link 502H is associated with a 64 Kbps version of the media program.

The master playlist is then transmitted to the user device 102. The user device 102 selects the version of the media program most appropriate for reception and playback. This selection can be based, for example, on the bandwidth or throughput of the communications channel between the media server 114 and the user device 102 and/or the size and speed of any buffer(s) 305 in the user device 102. The user device 102 transmits a media program version request for the selected version of the media program to the content selector 308. The content selector 308 receives the media program version request, generates a segment play list, and transmits the segment playlist to the user device 102. The user device 102 receives the segment playlist and requests the segments in the playlist in the order indicated from the media server 114 or the advertising provider 140.

FIG. 6 is a diagram presenting an exemplary embodiment of a segment playlist. The segment playlist 600 includes links 602A-602N to each segment of the media program. Link 602A, for example, is a link to segment 0 of the media program, and includes a token needed to retrieve the media program. Link 602 is a link to the next segment of the media program (segment 1), and also includes a token.

Figure 7:
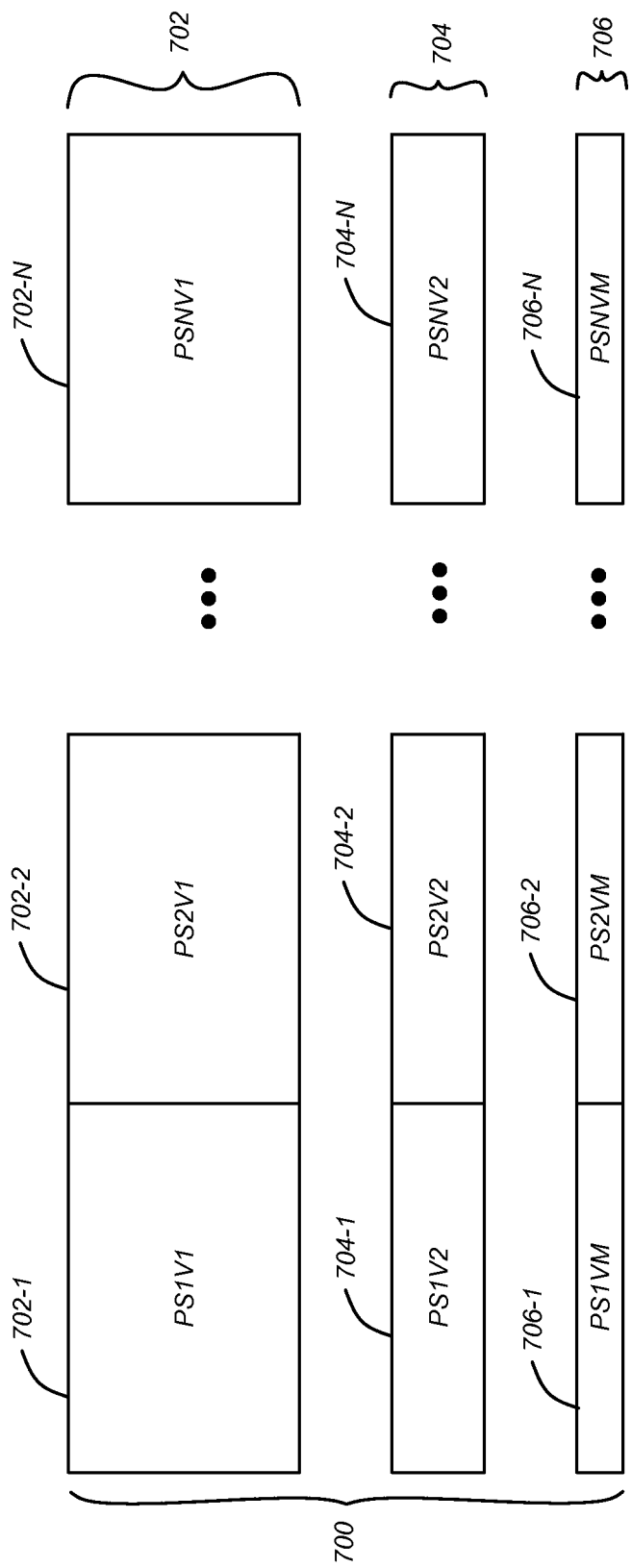
FIG. 7 is a diagram illustrating an aspect of a media program transmission protocol.

FIG. 7 is a diagram illustrating the segments used in the live streaming protocol. The media program provider 110 or another entity generates multiple different versions of the media program, each suitable for a different presentation throughput. In the illustrated embodiment, three versions are created, a high presentation throughput version 702, a medium presentation throughput version 704, and a low presentation throughput version 706. Furthermore, each version of the media program is separated into a plurality of segments. For example, the first version of the media program is separated into N segments 702-1 through 702-N, the second version of the media program is also separated into N segments 704-1 through 704-N, and the third version of the media program is separated into N segments 706-1 through 706-N. In the illustrated embodiment, all of the segments are of equal temporal length (that is, each is of the same time period), but this need not be the case. However, all of the versions of each particular temporal segment must all be the same temporal length. In other words, segment 702-1 may be temporally longer or shorter than 702-2, but must be the same temporal length as 704-1. Although only 3 versions of the media program are illustrated, the number of different media programs could be as little as two or as many as is needed. Typically, the number of versions is a tradeoff between the storage, generation, and management of the different versions and the conservation of transmission bandwidth and media program player processing requirements.

Figure 8A:
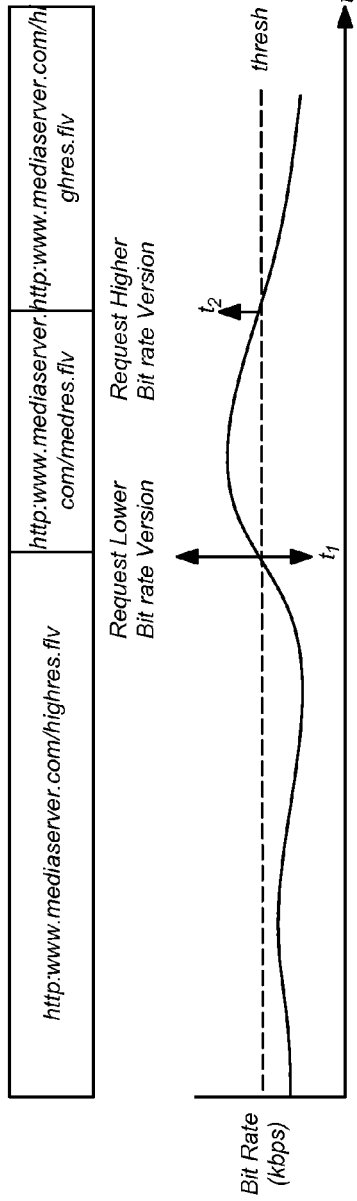
FIGS. 8A and 8B are diagrams illustrating how the media program player 304 can receive media programs of different bit rates.
Figure 8B:
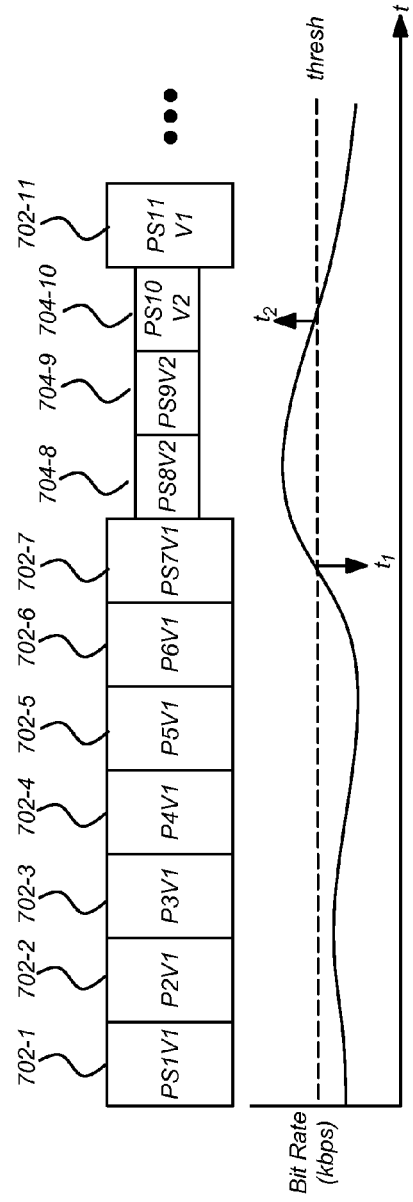

FIGS. 8A and 8B are diagrams illustrating how the media program player 304 can receive media programs of different bit rates. FIG. 8A illustrates an embodiment most relevant to a traditional streaming protocol such as RSTP or UDP, while the embodiment shown in FIG. 8B is most relevant to a live streaming protocol.

Turning first to FIG. 8A, a situation wherein the media program is offered in a high resolution (and high bit rate) version as well as a low resolution (and low bit rate) version is shown. The user device 102 or the media program provider 110, using information provided by the user device 102 determines that the throughput of the communications channel is sufficient to allow reception and processing of the high resolution version available at a first address (in the illustrated embodiment, at "http.www.mediaserver.com/highres.flv). The user device thereafter receives the high resolution version of the media program via the specified URL. However, as shown in FIG. 8A, the bit rate of the high resolution version of the media program changes over time, and at time $t_1$, exceeds a threshold that is a function of the bandwidth of the communication channel, the processing capability of the user device 102, and the size, fullness, and/or storage and retrieval time of a buffer 305 used to store the media program data as it arrives. The same problem can be encountered because the user device 102 is processing other data and cannot adequately process the incoming data on time, or because the bandwidth of the communications channel has changed. In any case, the user device 102 senses this problem (for example, by monitoring the amount of data in the buffer 305 and/or the rate at which the buffered data is being used without being replenished), and when necessary, requests a lower resolution (and lower bit rate version) of the media program (in the illustrated embodiment, available at http.www.mediaserver.com/medres.flv). The media program provider 110 provides that media program, and the user device 102 replays it for the user. At time $t_2$, the bit rate of the media program is such that the bit rate of the media program now is less than the threshold. At this time, the user device 102 may request the higher bit rate version of the media program or may continue to receive and present the medium resolution version.

FIG. 8B illustrates how the media program can receive media program segments while accounting for changes in the presentation throughput according to a live streaming protocol. In the illustrated example, the media program player 304 receives segments of the first (high presentation throughput) version of the media program 702-1 through 702-7 when the presentation throughput is greater than a minimum threshold. However, when the presentation throughput drops below the threshold value at time $t_1$, the media program player 304 receives media program segments of the medium resolution (704-8 through 704-10 and also shown in FIG. 4). Typically, the media program player 304 determines when a different version of the streamed media program is desired based on a variety of factors including the fullness of any buffer 305 storing segments before presenting them to the user, processing load, and communications channel bandwidth.

As described above, the delivery and presentation of digital media programs can be challenging because (1) the communication channel used to deliver the media program to the user device 102 is (a) typically of limited bandwidth and (b) can vary substantially over time and in mobile applications, the user's location, (2) the processing and presentation of the received media program by the user device 102 requires (a) significant throughput and processing speed which may change with time and (b) significant storage capacity and storage/retrieval speed of any buffering used in the user device 102.

Figure 9A:
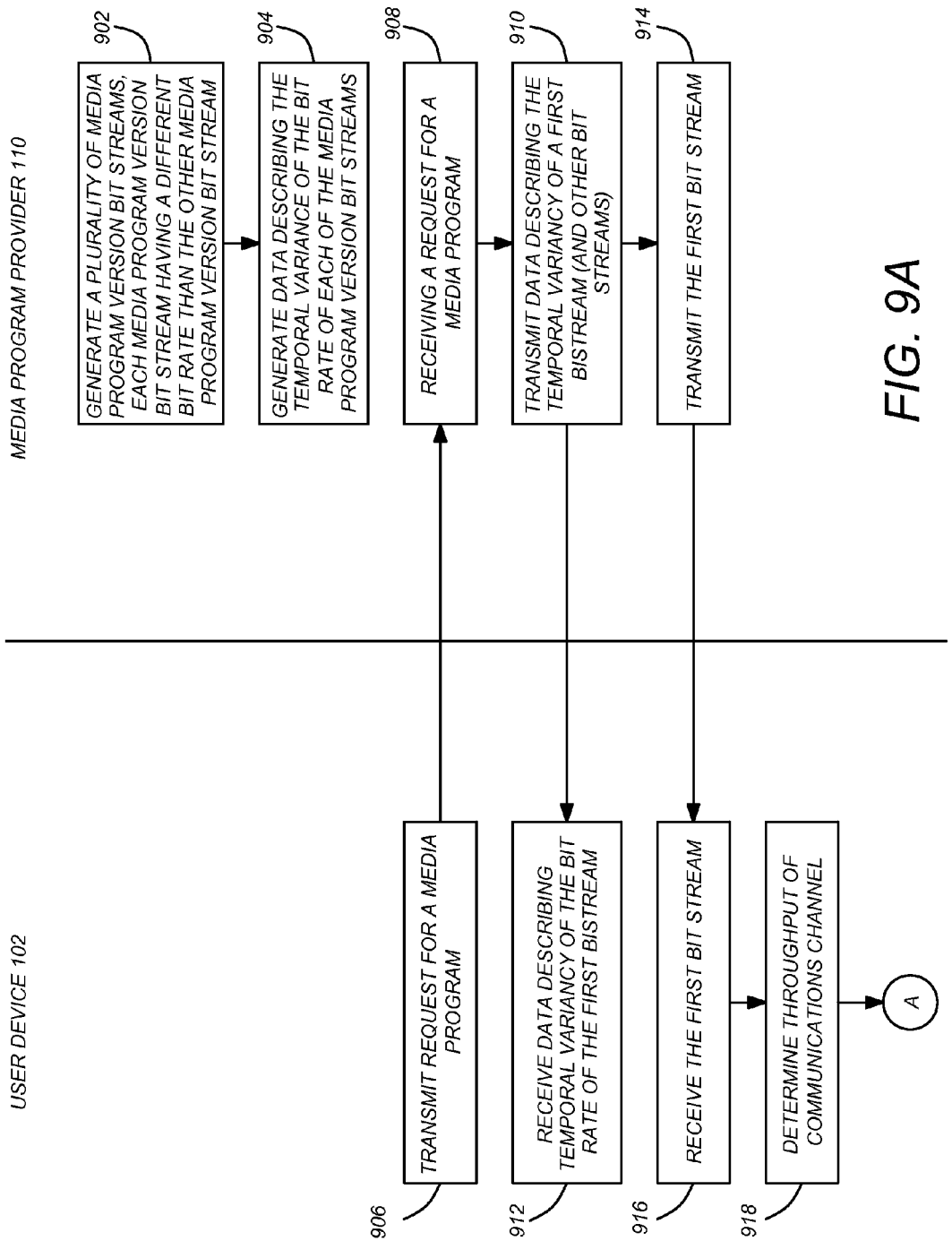
FIGS. 9A and 9B are diagrams illustrating the provision and use of data describing the temporal variability of the bitstreams carrying the media program.
Figure 9B:
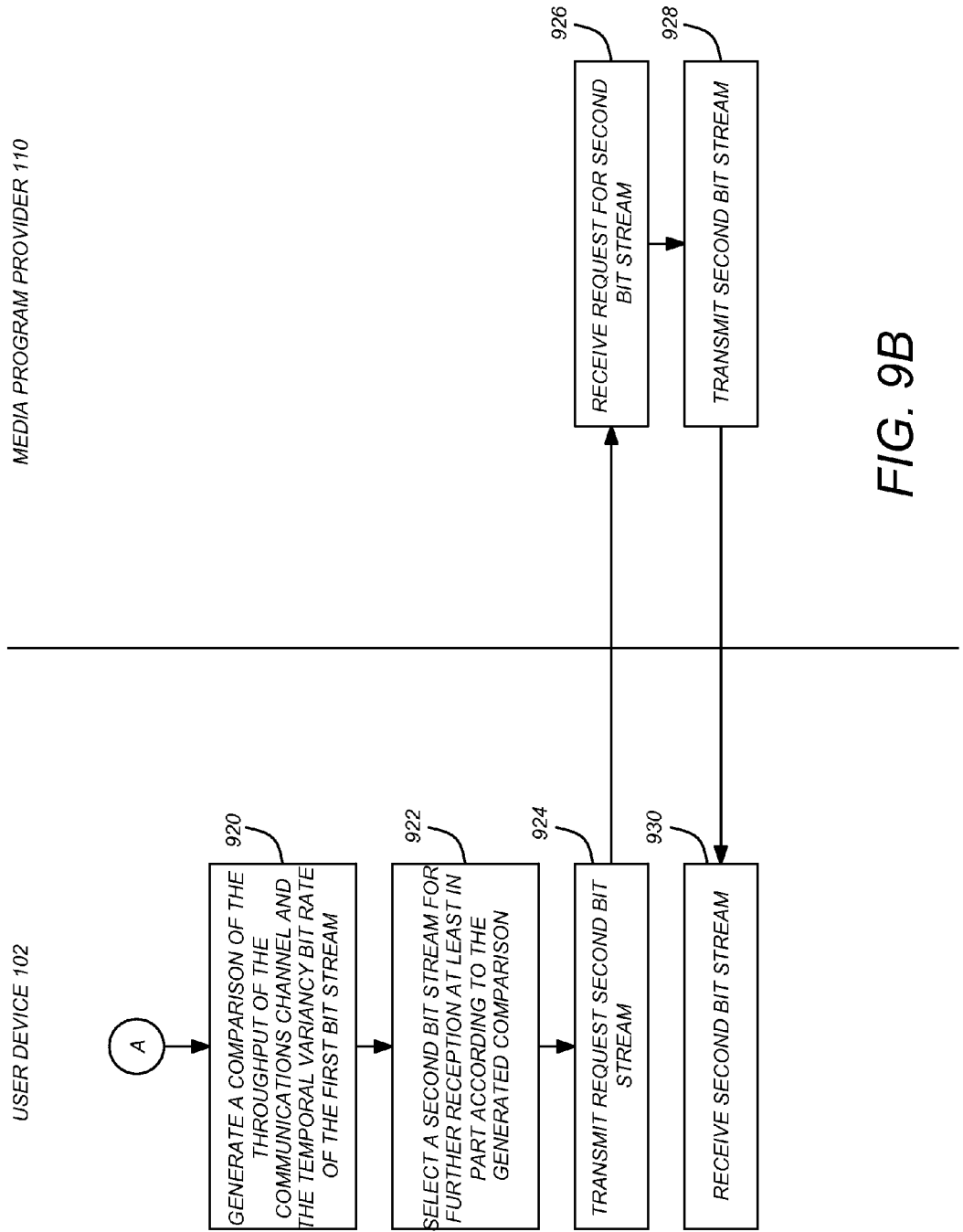

FIGS. 9A and 9B are diagrams illustrating a process ameliorating the foregoing problems by the provision and use of data describing the temporal variability of the bitstreams carrying the media program.

In block 902, a plurality of media program version bitstreams are generated, with each media program version bitstream having a different bit rate than the other media program version bitstreams. In one embodiment, media program version bitstreams having a lower bit rate have either lower resolution or a lower frame rate than media program version bitstreams that have a higher bit rate. Each of these bits streams may be continuous, and available from a single address, such as shown in FIG. 8A, or may comprise a plurality of segments, each available from a different address, as shown in FIG. 8B.

In block 904, data describing the temporal variance of the media program bitstream versions is generated. In one embodiment, the data is expressed as a simple statistical variance (e.g. the variance of time samples of the bit rate).

Figure 10:
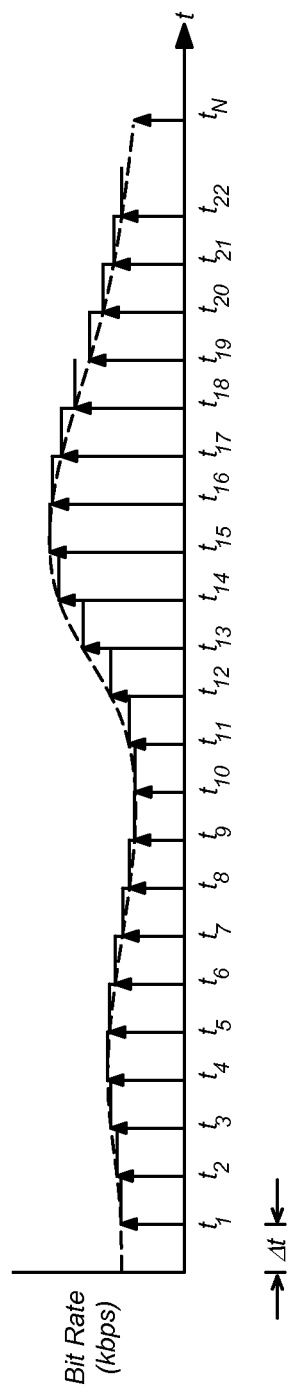
FIG. 10 is a diagram illustrating the bit rate of an exemplary media program version as a function of time.

FIG. 10 is a diagram illustrating the bit rate of an exemplary media program version as a function of time. The data describing the temporal variance of the bit rate of the media program bitstream version may be simply a measure of the statistical variance of the bit rate of the media program sampled at times $t_1, t_2, \ldots, t_n$, or $$\frac{n\sum_{i=1}^{n}(BR(t_i))^2 - \left(\sum_{i=1}^{n}BR(t_i)\right)}{n(n-1)}.$$

Alternatively, the data describing the temporal variance of the bit rate of the media program bitstream version may describe the bit rate as a function of time. This may comprise simply the bit rate at selected times or the average bit rate of the bitstream over a time period less than the duration of the media program (for example, $\Delta t$ in FIG. 10). Such average bit rates can be described for varying periods of time as well (e.g. $\Delta t$ need not be constant). For example, the data may comprise the average bit rate for the first 10 seconds of the media program and the average bit rate for the next minute of the media program. This allows more data to be provided in portions of the media program where the bit rate varies more substantially.

The temporal variance of the bit rate can also be described in terms of the coefficients of a series which approximates the bit rate as a function of time. In other words, if the bit rate as a function of time is BR(t), a Taylor series can be derived describing the bit rate, and the data describing the temporal variance of the bit rate can comprise the derived Taylor series parameters. These parameters can be processed by the user device 102 to reproduce the bit rate as a function of time BR(t). Similarly, since BR(t) represents a function over time, the data describing the bit rate of the media program bitstream can be expressed as a Fourier series or Fourier transform of BR(t) (hereinafter referred to as BR($\omega$)), and the temporal variance of the bit rate can include the parameters of the Fourier transform BR($\omega$)). As with the Taylor series example, the Fourier series or transform parameters can be processed at the user device 102, (e.g. by inverse Fourier transform) to reproduce BR(t).

Returning to FIG. 9A, the user device 102 transmits a request for a media program, as shown in block 906. This can be accomplished as described above with reference to FIGS. 3 and 4. The media program request may indicate not only the requested media program, but also, the version of the requested media program. In other words, the user device 102 may request a high resolution version of the media program, or lower resolution versions of the media program, depending on user preferences or an assessment of the throughput of the communications channel and processing capacity of the user device 102. Or, the media program request may simply include the requested media program, and the media program provider 110 may determine the appropriate version of the media program to transmit, based on an assessment of the bit rate of the requested media program, information regarding the media program player or user device 102 and/or the communication channel.

In blocks 910-916, the media program provider 110 transmits and the user device 102 receives the data describing the temporal variability of the selected (or requested) version of the media program as well as the bitstream of the selected (or requested) version. The data describing the temporal variability of the bit rate of the media program version may be transmitted in a separate message, or with the bitstream itself, for example, in a header. Further, the data may describe only the temporal variability of the selected or requested media program version, or may describe the temporal variability of the bit rate of the plurality of the media program versions, thus providing the user device 102 with information that can be used to select other media programs as required and further described below. The data describing the temporal variability of the bit rate of the media program can also be sent before the media program bitstream is transmitted, or after transmission has already begun. Furthermore, the data describing the temporal variability of the bit rate of the media program can be transmitted in separate messages, a bit at a time. For example, for embodiments where the media program is transmitted to the user device 102 in small segments, each segment may include information regarding the temporal variability of the bit rate of the media program for segment(s) that are to follow the current segment. This permits the user device 102 to determine which of the version of the media program bitstream to request.

In block 918, the media program player determines the throughput of the communications channel used to transmit the media program bitstream. This may be accomplished in real time by estimating the rate at which the media program bitstream is received by the user device 102, by the rate at which any memory used to buffer 305 the received bitstream becomes filled. Alternatively, this may be accomplished in advance of the receipt of the media program bitstream, for example, by determining the communications throughput with the same media program provider 110 for media programs received in the past. Throughput can also be estimated based upon time of day.

Turning to FIG. 9B, block 920 illustrates the generation of a comparison between the throughput of the communications channel and the temporal variability of the bitstream of the media program.

Figure 11:
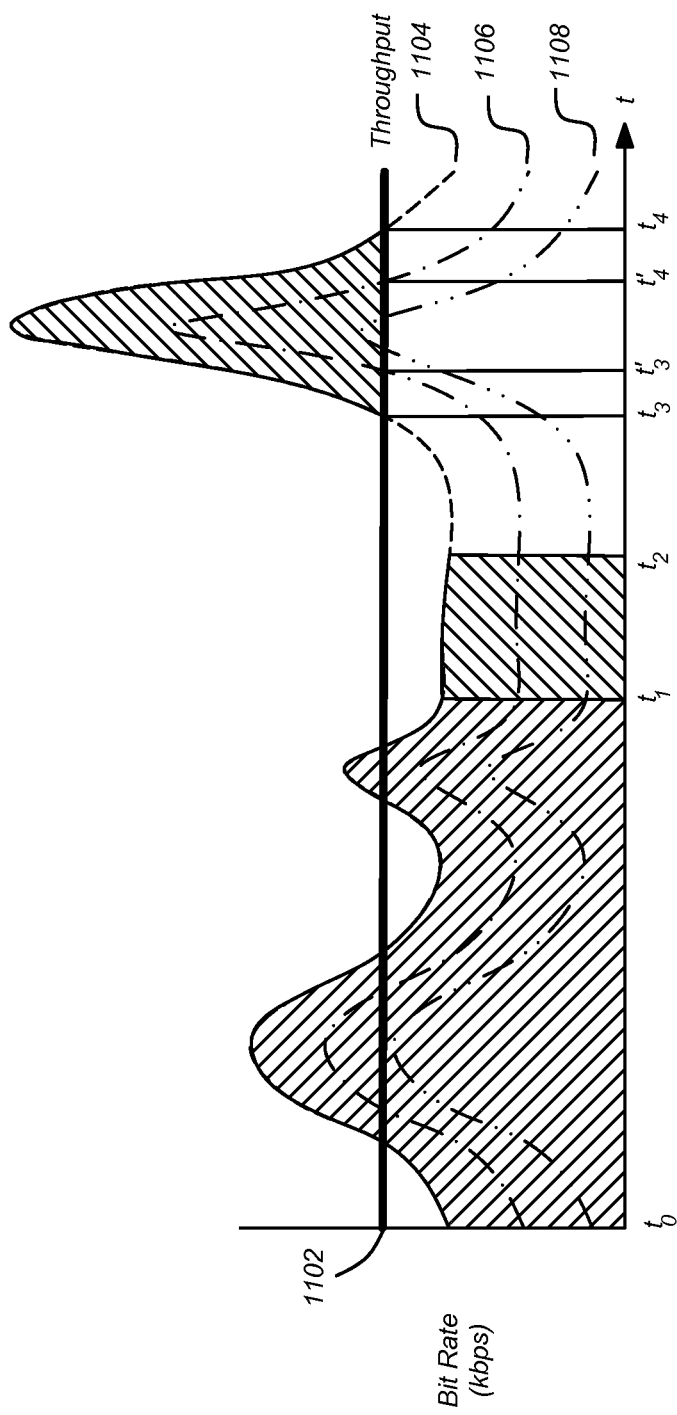
FIGS. 11 and 12 are diagrams illustrating one embodiment of how a comparison between the throughput of the communications channel and the temporal variability of the bitstream may be generated.

FIG. 11 is a diagram illustrating one embodiment of how a comparison between the throughput of the communications channel and the temporal variability of the bitstream may be generated. In the illustrated embodiment, the user device 102 has received and replayed the higher resolution media program bitstream 1104 up until time $t_1$. The user device 102 also includes a FIFO buffer 305 that is used to temporarily store the retrieved media program bitstream, with newly received bitstream data entering the buffer 305 at the same time that previously received bitstream data is read out of the buffer 305. That buffer 305 has received and stored the media program bitstream up until time $t_2$. Therefore, if no further media program bitstream data were to be received, the user device 102 would be able to play the media program up until time $t_2$.

As described above, the user device has determined the throughput of the communications link. That throughput can be determined, for example, using the total amount of data that has been received by the user device, and how long it took to download that data. Referring to FIG. 11, this can be determined by simply adding up all of the data received between time $t_0$ and $t_1$ (the current playback location), adding the total amount of data stored in the buffer 305 (data between time $t_1$ and $t_2$), and dividing by the time it took to receive the data $(t_1-t_0)$. In other words, the user device 102 can compute an estimate of $$\frac{\int_{t_0}^{t_2} BM(t)}{t_1 - t_0}.$$

The result is a measured average bit rate for the received media program between $t_1$ and $t_0$. This is indicated in FIG. 11 as item 1102.

Since the user device 102 has received data describing the temporal variability of the bit rate of the media program bitstream, the user device can look ahead in time to determine if considering data already received and buffered and data that can be expected to received if the average throughput continues at the current pace, the remainder of the media program bitstream cam be received without interrupting playback. In the illustrated example, this is possible if the throughput of the communications channel does not significantly change and so long as the amount of data currently buffered $$\int_{t_1}^{t_2} BM(t)\,dt$$

exceeds the shortfall that is expected from time $t_3$ to time $t_4$, or $$\int_{t_3}^{t_4} BM(t).$$

In other words, the user device will not need to select a media program version having a lower bit rate so long as the throughput does remains constant and $$\int_{t_1}^{t_2} BM(t)\,dt \geq \int_{t_3}^{t_4} BM(t)\,dt.$$

However, if $$\int_{t_1}^{t_2} BM(t)\,dt < \int_{t_3}^{t_4} BM(t)\,dt,$$

the user device must select a media program version having a lower bit rate (e.g. media program bitstream 1106 or 1108). The user device can do this by determining whether the amount of data currently buffered $$\int_{t_1}^{t_2} BM(t)$$

exceeds the shortfall that is expected from time $t'_3$ to time $t'_4$ of the lower bit rate media program bitstream 1106, or $$\int_{t_1}^{t_2} BM(t)\,dt \geq \int_{t'_3}^{t'_4} BM(t)\,dt.$$

If this is the case, the media program player may select the lower resolution media program player bitstream 1106.

Figure 12:
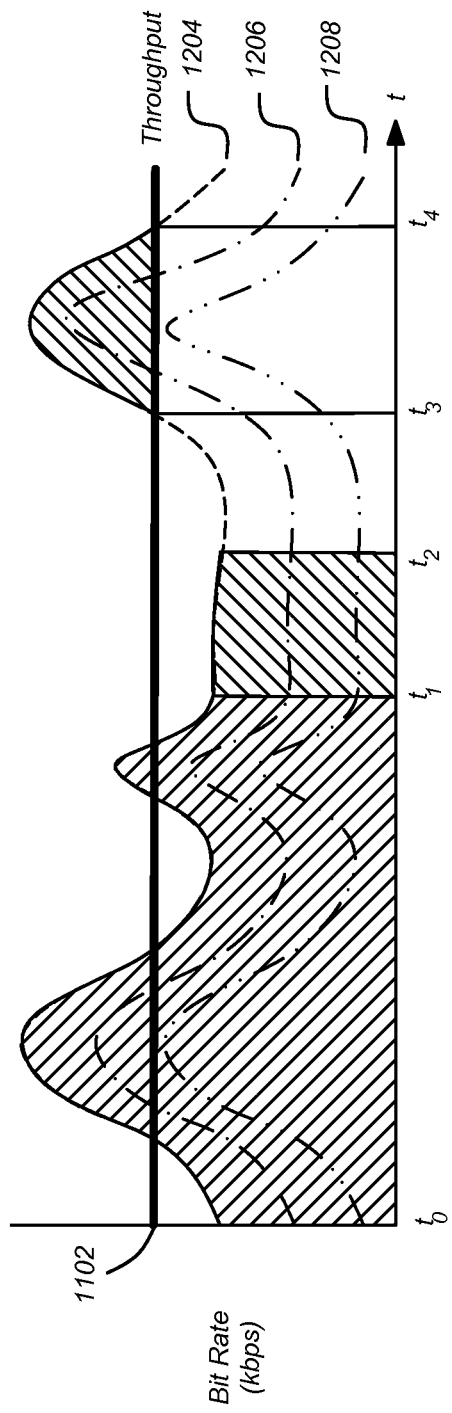

Importantly, this determination can be made in advance, so that disruptive bitstream changes can be minimized and can consider the substantial variability of the bit rate of the media program bitstream. For example, FIG. 12 is a diagram illustrating another possible plurality of bitstream bit rates for different media program versions. In this case, it is clear that $$\int_{t_1}^{t_2} BM(t)\,dt \geq \int_{t_3}^{t_4} BM(t)\,dt,$$

and there is no need to switch to a lower bit rate version of the media program. However, without the look ahead capability, the user device 102 may erroneously switch to a lower bit rate bitstream (e.g. bitstream 1206) at or near time $t_3$.

The same technique can be used to switch from a lower bit rate media program bitstream (e.g. 1106 to a higher bit rate media program bitstream (e.g. 1104)). In this case, since the communication channel throughput is much more than is required, the media program buffer 305 may fill rapidly. The user device 102 can detect the rapidly filling buffer 305, compute an average throughput for the communication channel, and looking at the bit rate for other higher resolution bitstreams, determine that higher resolution versions of the media program can be downloaded, processed, and presented without disruption. The user device 102 may then decide to request a version of the media program bitstream having a higher bit rate.

It is noteworthy that in the buffer 305 capacity may be considered in the foregoing determination. For example, if the buffer 305 capacity is small, the time interval between $t_1$ and $t_2$ will be smaller, and $$\int_{t_1}^{t_2} BM(t) \, dt$$

will be proportionately less. Since less data is buffered, the user device will likely need to switch to lower bit rate bitstreams earlier and more often. However, simply increasing the buffer 305 capacity does not ameliorate the need to select different bitstreams, since the value of $$\int_{t_1}^{t_2} BM(t) \, dt$$

is also limited by the throughput of the communications channel and how fast buffered data is used up during playback.

In one embodiment, once the user device 102 determines that the communications channel does not support the further reception of a high bit rate version of the media program, the user device immediately switches to receive and playback a lower bit rate version of the media program. In another embodiment, the user device 102 continues to play the higher bit rate version of the media program stored in the buffer 305, but receives and stores the lower bit rate version of the media program from that point on. For example, if the user device 102 determines at time $t_1$ that the communications channel throughput is insufficient to support playback of the higher bit rate version of the media program 1104 until the end of the media program, the user device 102 may continue to read the data from time $t_1$ to $t_2$ from the buffer 305, while refilling the buffer 305 with data from time $t_2$ forward using the lower bit rate version of the media program 1106. The user device 102 may also play the buffered media program data and simply switch to receive a lower bit rate version once the buffered data is exhausted.

The foregoing computations may be made at a number of times during playback of the media program. For example, an estimate of the throughput may be made shortly after bitstream data is received, and the appropriate bitstream selected thereafter. Also, the computation may be repeated after trick play operations such as pause, reverse, or fast forwarding, as such operations will likely affect buffer 305 fullness. Or, the foregoing computations may simply be made periodically throughout playback of the media program.

Returning to FIG. 9B, in block 922, a second bitstream is selected for further reception at least in part according to the generated comparison of block 920. A request for the second bitstream is transmitted to the media program provider 110, where it is received, as shown in blocks 924 and 926. The second media program bitstream is then transmitted by the media program provider 110 and received by the user device, as shown in blocks 928 and 930.

Conclusion

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method comprising:
   determining, by a computing device, data describing a temporal variability of a bit rate of a first bitstream;
   receiving, by the computing device, the first bitstream through a communication channel;
   determining, by the computing device, a throughput for the communication channel;
   comparing, by the computing device, the throughput of the communication channel with the data describing the temporal variability of the bit rate of the first bitstream to determine a variance of the first bitstream from the throughput for the communication channel for a portion of a media program not already received;
   determining, by the computing device, an amount of data currently buffered in a buffer for the media program; and
   comparing, by the computing device, the amount of data currently buffered to the variance for the portion to determine whether to switch to receiving a second bitstream, wherein the second bitstream has a different bit rate from the first bitstream.

2. The method of claim 1, further comprising:
   when the amount of data currently buffered does not exceed the variance, switching to receiving the second bitstream, wherein the second bitstream has a lower bit rate than the first bitstream.

3. The method of claim 1, further comprising:
   when the amount of data currently buffered exceeds the variance, not switching to receiving the second bitstream, wherein the second bitstream has a lower bit rate than the first bitstream.

4. The method of claim 3, wherein the variance comprises a shortfall of data that is expected for the portion of the media program when the bitrate of the media program is above the throughput of the communication channel.

5. The method of claim 1, further comprising:
   when the amount of data currently buffered exceeds the variance, switching to receiving the second bitstream, wherein the second bitstream has a higher bit rate than the first bitstream.

6. The method of claim 1, further comprising switching to receiving the second bitstream when the throughput of the communication channel is greater than an amount of data expected to be received for the portion of the media program, wherein the second bitstream has a higher bit rate than the first bitstream.

7. The method of claim 1, wherein the throughput of the communication channel is based on the receiving of the first bitstream through the communication channel.

8. The method of claim 1, wherein the throughput of the communication channel is based on a factor other than the receiving of the first bitstream through the communication channel.

9. The method of claim 1, wherein comparing the amount of data currently buffered to the variance to determine whether to switch to receiving the second bitstream comprises using a capacity of the buffer in the comparison to determine whether to switch.

10. The method of claim 1, wherein determining whether to switch is determined before a point in the media program to switch to receiving the second bitstream occurs.

11. The method of claim 10, further comprising:
sending a request for the second bitstream when the point in the media program is reached.

12. The method of claim 1, wherein determining whether to switch to receiving the second bitstream is based on whether playback of the media program will be interrupted based on the variance and the amount of data in the buffer.

13. A non-transitory computer-readable storage medium containing instructions, that when executed, control a computer system to be configured for:
determining data describing a temporal variability of a bit rate of a first bitstream;
receiving the first bitstream through a communication channel;
determining a throughput for the communication channel;
comparing the throughput of the communication channel with the data describing the temporal variability of the bit rate of the first bitstream to determine a variance of the first bitstream from the throughput for the communication channel for a portion of a media program not already received;
determining an amount of data currently buffered in a buffer for the media program; and
comparing the amount of data currently buffered to the variance for the portion to determine whether to switch to receiving a second bitstream, wherein the second bitstream has a different bit rate from the first bitstream.

14. The non-transitory computer-readable storage medium of claim 13, further configured for:
when the amount of data currently buffered does not exceed the variance, switching to receiving the second bitstream, wherein the second bitstream has a lower bit rate than the first bitstream.

15. The non-transitory computer-readable storage medium of claim 13, further configured for:
when the amount of data currently buffered exceeds the variance, not switching to receiving the second bitstream, wherein the second bitstream has a lower bit rate than the first bitstream.

16. The non-transitory computer-readable storage medium of claim 15, wherein the variance comprises a shortfall of data that is expected for the portion of the media program when the bitrate of the media program is above the throughput of the communication channel.

17. The non-transitory computer-readable storage medium of claim 13, further configured for:
when the amount of data currently buffered exceeds the variance, switching to receiving the second bitstream, wherein the second bitstream has a higher bit rate than the first bitstream.

18. The non-transitory computer-readable storage medium of claim 13, further configured for switching to receiving the second bitstream when the throughput of the communication channel is greater than an amount of data expected to be received for the portion of the media program, wherein the second bitstream has a higher bit rate than the first bitstream.

19. A method comprising:
generating, by a computing device, data describing the temporal variability of the bit rate of a first bitstream;
receiving, by the computing device, a request for a media program from a user device;
transmitting, by the computing device, the data describing the temporal variability of the bit rate of the first bitstream;
transmitting, by the computing device, the first bitstream on a communication channel;
receiving, by the computing device, a request for a second bitstream from the user device, the request based at least in part on a first comparison of a throughput of the communication channel with the data describing the temporal variability of the bit rate of the first bitstream to determine a variance of the first bitstream from the throughput for the communication channel for a portion of the media program not already received and a second comparison of an amount of data currently buffered to the variance for the portion to determine whether to switch to receiving the second bitstream; and
transmitting, by the computing device, the second bitstream on the communication channel, wherein the second bitstream has a different bit rate from the first bitstream.

20. The method of claim 19, wherein the request for the second bitstream is received when the amount of data currently buffered does not exceed the variance, wherein the second bitstream has a lower bit rate than the first bitstream.

21. The method of claim 19, wherein when the amount of data currently buffered exceeds the variance, the request for the second bitstream is not received, wherein the second bitstream has a lower bit rate than the first bitstream.

22. The method of claim 21, wherein the variance comprises a shortfall of data that is expected for the portion of the media program when the bitrate of the media program is above the throughput of the communication channel.

23. The method of claim 19, wherein the request for the second bitstream is received when the amount of data currently buffered exceeds the variance, wherein the second bitstream has a higher bit rate than the first bitstream.

24. The method of claim 19, wherein the request for the second bitstream is received when the throughput of the communication channel is greater than an amount of data expected to be received for the portion of the media program, wherein the second bitstream has a higher bit rate than the first bitstream.

25. The method of claim 19, wherein the first comparison of the amount of data currently buffered to the variance to determine whether to switch to receiving the second bitstream comprises using a capacity of the buffer in the comparison to determine whether to switch.

26. An apparatus comprising:
one or more computer processors; and
a non-transitory computer-readable storage medium comprising instructions, that when executed, control the one or more computer processors to be configured for:

generating data describing the temporal variability of the bit rate of a first bitstream;
receiving a request for a media program from a user device;
transmitting the data describing the temporal variability of the bit rate of the first bitstream;
transmitting the first bitstream on a communication channel;
receiving a request for a second bitstream from the user device, the request based at least in part on a first comparison of a throughput of the communication channel with the data describing the temporal variability of the bit rate of the first bitstream to determine a variance of the first bitstream from the throughput for the communication channel for a portion of the media program not already received and a second comparison of an amount of data currently buffered to the variance for the portion to determine whether to switch to receiving the second bitstream; and
transmitting the second bitstream on the communication channel, wherein the second bitstream has a different bit rate from the first bitstream.

\* \* \* \* \*